United States Patent
Nomura et al.

(10) Patent No.: US 9,511,493 B2
(45) Date of Patent: Dec. 6, 2016

(54) INFORMATION PROCESSING APPARATUS AND METHOD FOR CONTROLLING THE SAME

(75) Inventors: Osamu Nomura, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 824 days.

(21) Appl. No.: 13/582,116

(22) PCT Filed: Mar. 7, 2011

(86) PCT No.: PCT/JP2011/001318
§ 371 (c)(1),
(2), (4) Date: Aug. 31, 2012

(87) PCT Pub. No.: WO2011/111362
PCT Pub. Date: Sep. 15, 2011

(65) Prior Publication Data
US 2012/0327224 A1 Dec. 27, 2012

(30) Foreign Application Priority Data
Mar. 10, 2010 (JP) ................................. 2010-053409

(51) Int. Cl.
*B25J 9/16* (2006.01)
(52) U.S. Cl.
CPC .................... *B25J 9/1671* (2013.01)
(58) Field of Classification Search
CPC ................... B25J 9/1671; B25J 9/1605; G05B 2219/37555; G05B 2219/32351
See application file for complete search history.

(56) References Cited

U.S. PATENT DOCUMENTS

| 5,231,693 | A | 7/1993 | Backes |
| 5,749,058 | A * | 5/1998 | Hashimoto ..................... 701/23 |
| 6,414,711 | B2 * | 7/2002 | Arimatsu et al. ............... 348/86 |
| 7,200,260 | B1 * | 4/2007 | Watanabe et al. ............ 382/153 |
| 7,802,193 | B1 * | 9/2010 | McDonald et al. ........... 715/757 |
| 8,095,237 | B2 * | 1/2012 | Habibi et al. ................. 700/245 |
| 8,326,460 | B2 * | 12/2012 | Ban et al. ..................... 700/259 |

(Continued)

FOREIGN PATENT DOCUMENTS

| CN | 1846181 A | 10/2006 |
| CN | 1903523 A | 1/2007 |

(Continued)

*Primary Examiner* — Brian Yenke
(74) *Attorney, Agent, or Firm* — Canon USA, Inc., IP Division

(57) ABSTRACT

An information processing apparatus includes an imaging unit and is capable of setting arrangement of a structural member of a robot system which works based on an image captured by the imaging unit. The information processing apparatus includes an arrangement unit configured to arrange a virtual object corresponding to the structural member in a virtual space corresponding to a working space of the robot system, a first acquisition unit configured to acquire a virtual space image in the virtual space which corresponds to the captured image and in which the virtual object is arranged, and a second acquisition unit configured to acquire an evaluation value indicating adaptation of arrangement of the virtual object to the work of the robot system based on the virtual space image.

13 Claims, 15 Drawing Sheets

(56) References Cited

U.S. PATENT DOCUMENTS

| | | | | |
|---|---|---|---|---|
| 8,589,122 | B2* | 11/2013 | Nagatsuka et al. | 703/1 |
| 9,026,234 | B2* | 5/2015 | Suzuki | 700/56 |
| 2008/0013825 | A1* | 1/2008 | Nagatsuka et al. | 382/153 |
| 2008/0059131 | A1* | 3/2008 | Tokita | G06F 3/011 703/5 |
| 2008/0301072 | A1* | 12/2008 | Nagatsuka et al. | 706/12 |
| 2011/0270444 | A1* | 11/2011 | Nagata et al. | 700/258 |
| 2012/0059517 | A1* | 3/2012 | Nomura | 700/259 |
| 2012/0259462 | A1* | 10/2012 | Aoba | 700/245 |
| 2013/0147944 | A1* | 6/2013 | Zhang et al. | 348/95 |
| 2014/0188274 | A1* | 7/2014 | Namiki | 700/254 |

FOREIGN PATENT DOCUMENTS

| | | |
|---|---|---|
| CN | 101088718 A | 12/2007 |
| CN | 101105715 A | 1/2008 |
| DE | 10351669 A1 | 6/2005 |
| EP | 1518648 A2 | 3/2005 |
| JP | 2007-241857 A | 9/2007 |
| JP | 2008-021092 A | 1/2008 |
| JP | 2008-296330A A | 12/2008 |

\* cited by examiner

Legend:
100 structural member
200 work area
10 lighting system
11 robot arm
12 area frame
13 conveying apparatus
14 work table
15 holding device
16 holding device
18 control unit
20 actuator
21 light arrangement possible area
22 imaging arrangement possible area Legend:
26 screen device
27 holding apparatus
28 actuator
29 mirror surface
30 transparent body
31 certain range

INFORMATION PROCESSING APPARATUS AND METHOD FOR CONTROLLING THE SAME

TECHNICAL FIELD

The present invention relates to an information processing apparatus and a method for controlling the same for setting an arrangement of components for a robot system equipped with an imaging unit.

BACKGROUND ART

In recent years and in a manufacturing site such as a factory, a robot system equipped with a robot arm often does work instead of a human. The work that the robot system can do has been complicated and sophisticated. For example, the robot system equipped with an imaging camera acquires a captured image of an object to be worked such as a manufactured component and analyzes the captured image, thereby allowing the robot arm to be moved to a position suitable for the work.

In the above robot system, if the field of view of the imaging camera is obstructed by an obstacle such as a work table, a necessary image cannot be captured to preclude the robot system from doing a proper work. Therefore, in the robot system doing a complicated work, it is required to arrange structural members such as the robot arm, the imaging camera, and the object to be worked in an appropriate position.

Japanese Patent Application Laid-Open No. 2008-21092 discusses a robot system equipped with an imaging camera which acquires a virtual space image (computer graphics image) imitating an image captured by the imaging camera. The virtual space image is visually confirmed by an operator and the operator arranges the imaging camera in a proper position.

In the technique discussed in Japanese Patent Application Laid-Open No. 2008-21092, however, the operator visually confirms the virtual space image, so that degree of freedom of arrangement of the structural member is high to increase a burden to the operator when a complicated and manifold work is done. For example, if it is assumed that a lighting system has 20 patterns of lighting directions and 10 candidates for a lighting position, and an imaging camera has 20 patterns of imaging directions and 10 candidates for an imaging position. In this case, the operator has to confirm 20 *20*10*10=40000 combinations of the virtual space images to find the arrangement most suitable for the work, which makes it very difficult for the operator to visually confirm the images. The more complicated the robot system, the greater the number of the virtual space images to be confirmed and the burden to the operator.

CITATION LIST

Patent Literature

PTL 1: Japanese Patent Application Laid-Open No. 2008-21092

SUMMARY OF INVENTION

The present invention has been made in consideration of the above situation, and has as its object to solve the above problems, reduce a burden to an operator, and properly arrange structural members of a complicated robot system.

According to the present invention, the foregoing object is attained by providing information processing apparatus including an imaging unit and capable of setting arrangement of a structural member of a robot system which works based on an image captured by the imaging unit, the information processing apparatus including an arrangement unit configured to arrange a virtual object corresponding to the structural member in a virtual space corresponding to a working space of the robot system, a first acquisition unit configured to acquire a virtual space image in the virtual space which corresponds to the captured image and in which the virtual object is arranged, and a second acquisition unit configured to acquire an evaluation value indicating adaptation of arrangement of the virtual object to the work of the robot system based on the virtual space image.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Configuration of a Robot System According to a First Exemplary Embodiment

Figure 1:
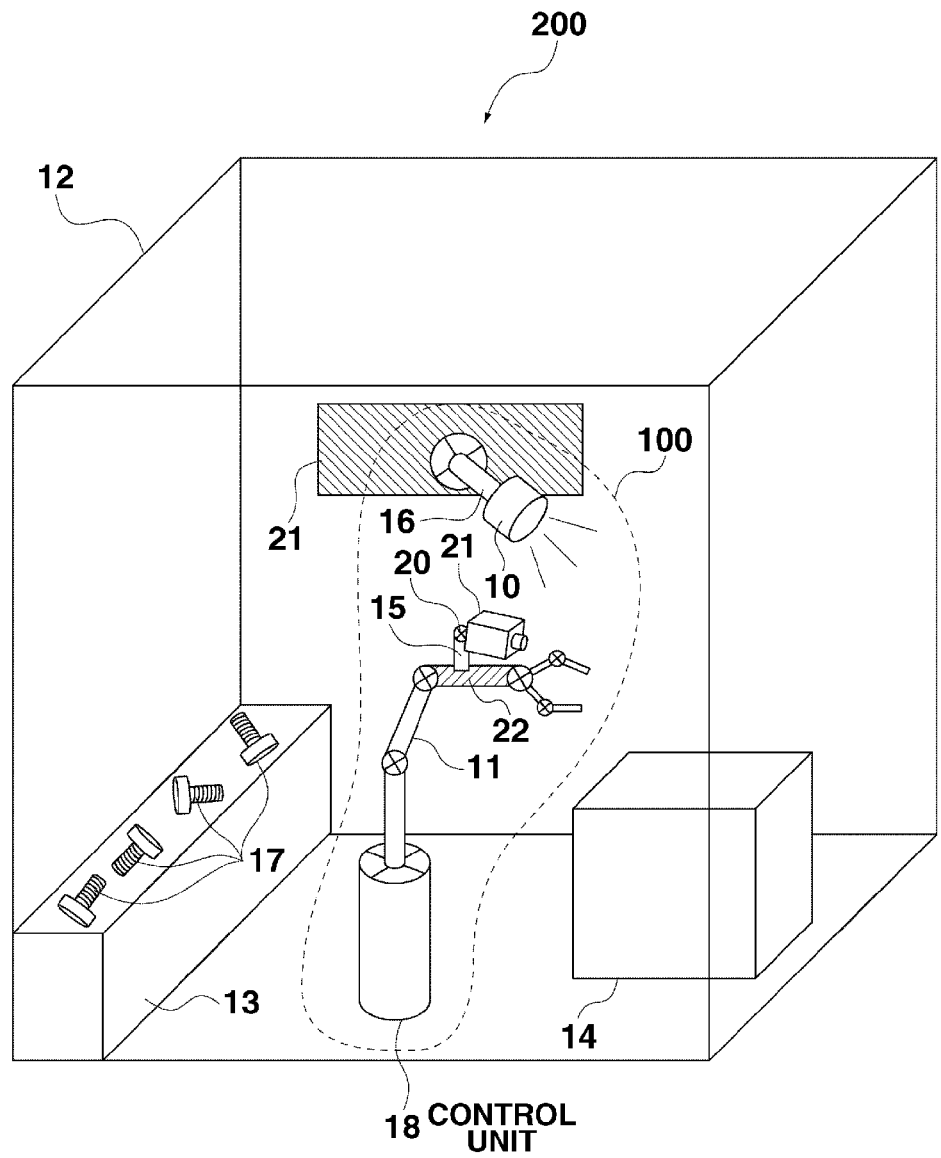
FIG. 1 illustrates an example of a configuration of a robot system according to a first exemplary embodiment.

FIG. 1 illustrates a configuration of a robot system according to a first exemplary embodiment. In a work area 200, an object to be worked (a component) is assembled by a robot arm in a production line. An area frame 12 covers a part or all of the work area 200 with a transparent component such as reinforced plastics. A structural member 100 of the robot system according to the present exemplary embodiment includes the followings.

A robot arm 11 grips and processes an object to be worked. The robot arm 11 has a plurality of joints, so that the robot arm 11 can take various positions and orientations. An imaging unit 9 is arranged on the robot arm 11. The imaging unit 9 may include a video camera for detecting visible light to acquire a captured image. A lighting system 10 illuminates an object to be worked. The lighting system 10 may include a light which can emit illumination light and can adjust the type, strength, and pattern of the illumination light. The lighting system 10 includes an actuator 19 to enable changing an illumination direction of the illumination light.

A holding device 16 which can hold the lighting system 10 includes a plurality of actuators 19 and can change the illumination direction of the lighting system 10. A holding device 15 connects the robot arm 11 to the imaging unit 9. The holding device 15 includes an actuator 20 and can change the orientation of the imaging unit 9 with respect to the robot arm 11. The above described components are collectively referred to as a structural member 100 of the robot system according to the present exemplary embodiment.

A control unit 18 is connected to the structural member 100 of the robot system and controls operations of respective components. The control unit 18 includes a central processing unit (CPU), a random access memory (RAM), and a read-only memory (ROM) storing operation programs and various data pieces. The control unit 18 functions as an information processing apparatus for setting the arrangement of the structural member 100 of the robot system based on information stored in the ROM about the structural member 100 of the robot system. The information processing is described in detail below.

Further, the control unit 18 controls the illumination light and orientation of the lighting system 10, the image processing of images acquired by the imaging unit 9, and the operation of the robot arm 11 according to procedures described in the computer program stored in the ROM. For example, the control unit 18 extracts an object to be worked 17 from a captured image acquired by the imaging unit 9 and transmits a control signal for gripping and processing the object to be worked 17 to the robot arm 11 based on the extraction result.

An object yet to be worked is placed on a conveying apparatus 13. A work table 14 is used for tasks such as gripping, processing, and assembling of the object to be worked. The object to be worked 17 is subjected to gripping, processing, and assembling by the robot arm 11. As illustrated in FIG. 1, the object to be worked 17 may include components such as screws and others. A light arrangement possible area 21 is an area in which the lighting system 10 can be arranged. An imaging arrangement possible area 22 is an area in which the imaging unit 9 can be arranged.

Information Processing

Figure 2:
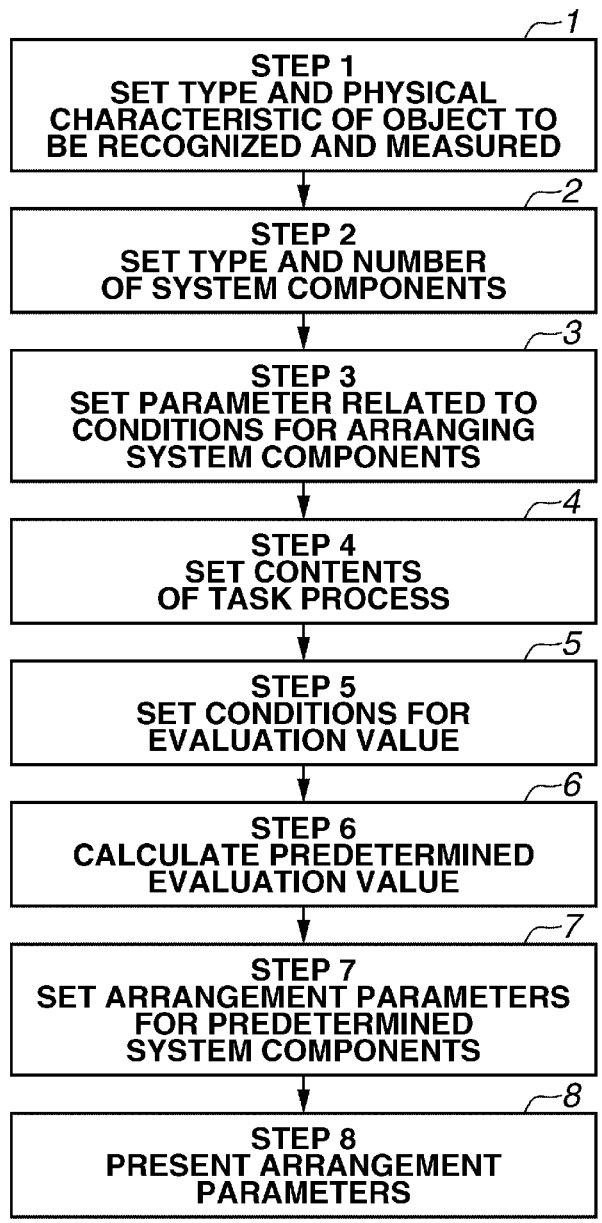
FIG. 2 illustrates information processing executed by the robot system according to the first exemplary embodiment.

FIG. 2 illustrates the information processing executed by the robot system according to the present exemplary embodiment. The information processing in FIG. 2 is the processing for setting appropriate arrangement parameters of each of the structural member 100 of the robot system according to the present exemplary embodiment. The information processing executed by the robot system according to the present exemplary embodiment is described below with reference to FIG. 2. The information processing illustrated in FIG. 2 is executed by the control unit 18.

Step 1: Setting Type and Physical Characteristics of an Object to be Recognized and Measured In the step 1 in which the type and the physical characteristics of an object to be recognized and measured are set, the information about the type and the physical characteristics of an object to be recognized and measured in the system according to the present exemplary embodiment is set.

The object to be recognized and measured according to the present exemplary embodiment is the object to be worked 17. The physical characteristic includes a shape, rigidity, and optical characteristic of an object, for example. The shape of the object is a shape model such as three-dimensional CAD data. The rigidity of the object is Young's modulus and vibration damping characteristics. The optical characteristic of the object may be bidirectional reflectance distribution function (BRDF), bidirectional transmittance distribution function (BTDF), and bidirectional scattering distribution function (BSDF).

The setting in the step 1 is performed such that the control unit 18 reads the data previously recorded in a database. Alternatively, the control unit 18 may perform the setting by receiving an input from a user.

Step 2: Setting Characteristics Information about System Components

In the step 2 in which characteristics information about system components is set, the characteristics information about the system components included in a recognition and measurement control system is set.

The system components according to the present exemplary embodiment include the imaging unit 9, the lighting system 10, and the robot arm 11. For example, the characteristics information about the imaging unit 9 may include a focal length, a size of an image sensor, and the like. The characteristics information about the lighting system 10 may include the type of the illumination light, lighting strength, and an illuminating pattern. The characteristics information about the robot arm 11 may include shape data and an operation dynamic model. The characteristics information about the conveying apparatus 13 on which the object to be worked is placed and about the work table 14 on which the object to be worked is assembled may be set.

The characteristics information about the components has been prepared as a database for each manufacturer and type of the component. The characteristics information about each component may be set by a user specifying a manufacturer and a type thereof.

The setting in the step 2 is performed such that the control unit 18 reads the data previously recorded in the database as is the case with the step 1. Alternatively, the control unit 18 may perform the setting by receiving an input from a user. In the step 2, the number of each of the system components may be set.

As illustrated in FIG. 2, the recognition and measurement control system according to the present exemplary embodiment includes one camera, one robot arm, and one lighting system, so that the number of each of the system components are set to be one in the step 2.

Step 3: Setting Parameters Related to Conditions for Arranging System Components In the step 3 in which parameters related to conditions for arranging the system components are set, the conditions for a position and an orientation for arranging each system component. Objects to be set according to the present exemplary embodiment are the robot arm 11, the imaging unit 9, and the lighting system 10.

The position where the robot arm 11 is arranged in the work area 200 is set. In the present exemplary embodiment, the robot arm 11 arranged in the work area 200 is referred by a global coordinate system.

The position where the lighting system 10 is arranged in the work area 200 is set. As described above, the lighting system 10 is arranged in the light arrangement possible area 21. The illumination direction of the lighting system 10 can be changed by the actuator 19.

The position where the imaging unit 9 is arranged on the robot arm is set. As described above, the imaging unit 9 is arranged in the imaging arrangement possible area 22. The image capturing direction of the imaging unit 9 can be changed by the actuator 20. In the present exemplary embodiment, the imaging unit 9 is arranged on the robot arm which is a movable object, so that the imaging unit 9 is referred by a local coordinate system.

Step 4: Setting Contents of Task Process

In the step 4 in which contents of a task process are set, contents of a process of a task executed based on recognition and measurement results are set. In the present exemplary embodiment, information about the operation of an assembly process of the robot arm 11 is set.

As the information about the operation of the assembly process, information about the position and operation of the robot arm 11 when gripping the object to be worked 17 in the work area 200 is set. Further, information about the position and operation of the robot arm 11 when executing an operation of assembling the object to be worked 17 in the work area 200 is set. Generally, information about the operation of the task process is information about the coordinates of positions traced by the robot arm 11 and an operation speed of the robot arm 11.

As described in the step 2, since the robot arm 11 already has the operation dynamic model determined by the type of the robot arm 11, a locus of operation of the robot arm 11 at the time of executing the assembly process described below can be calculated.

As another example, a typical task process model is previously set and the corresponding task process model (the assembly of the object to be worked 17 according to the present exemplary embodiment) is selected, thereafter, positions where a component is supplied and assembled may be specified.

In this case, the locus of operation traced by the robot arm 11 is set in advance for each typical task process. The operation of the robot arm 11 is determined according to the positions where a component is supplied and assembled.

The processes in the above steps 1 to 4 are performed to acquire the conditions for virtually setting the structural member 100 of the robot system. In the step 4, a virtual space image in which each of the structural member 100 of the robot system is virtually set is generated by the conditions acquired in the steps 1 to 4.

In the present exemplary embodiment, each of the structural member 100 of the robot system generated by computer graphics (a virtual object) is arranged to a virtual space corresponding to a work space. The control unit 18 functions as a first acquisition unit configured to acquire a virtual space image and generates, as a virtual space image, the computer graphics image imitating an image acquired by the imaging unit 9 capturing the work space.

Figure 3:
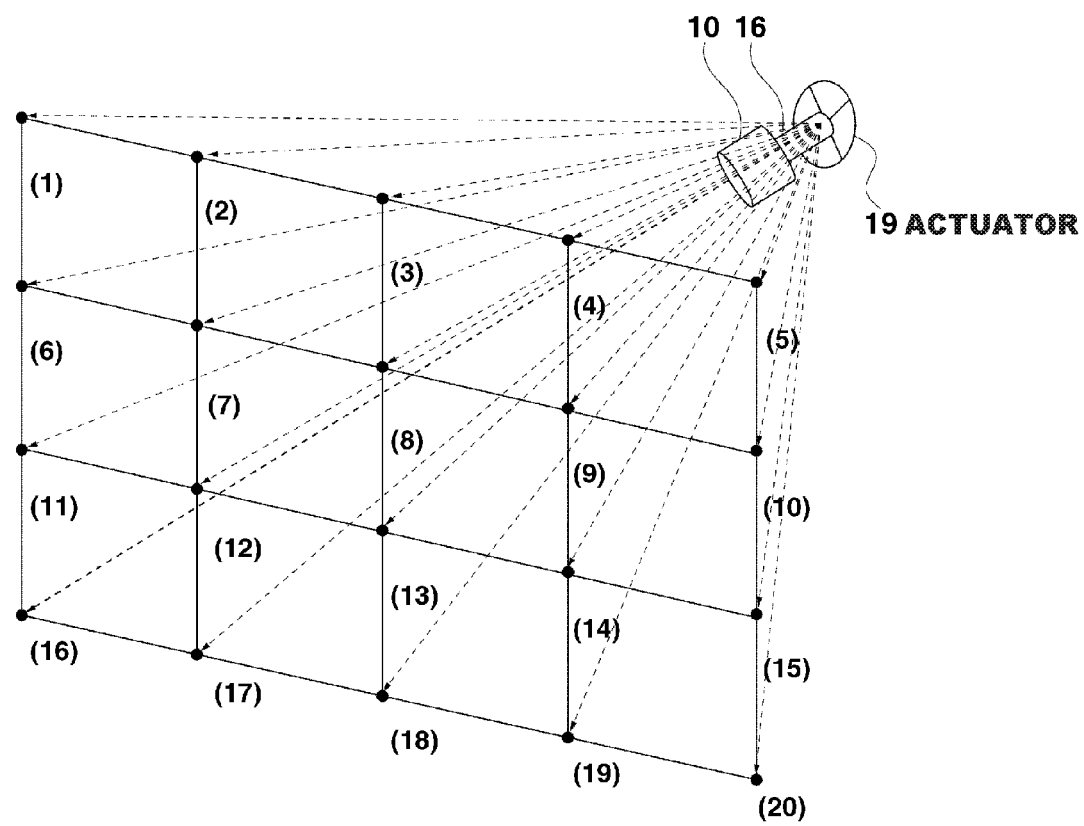
FIG. 3 illustrates directions that a lighting system according to the first exemplary embodiment can select.
Figure 4:
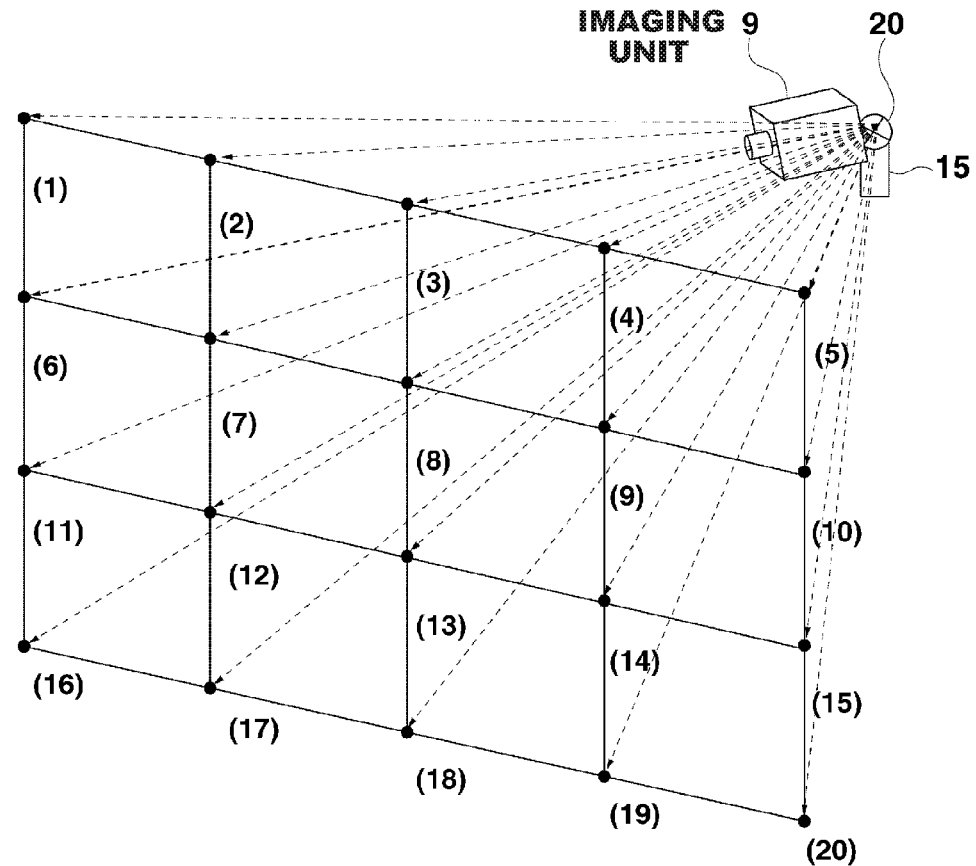
FIG. 4 illustrates directions that an imaging unit according to the first exemplary embodiment can select.
Figure 5:
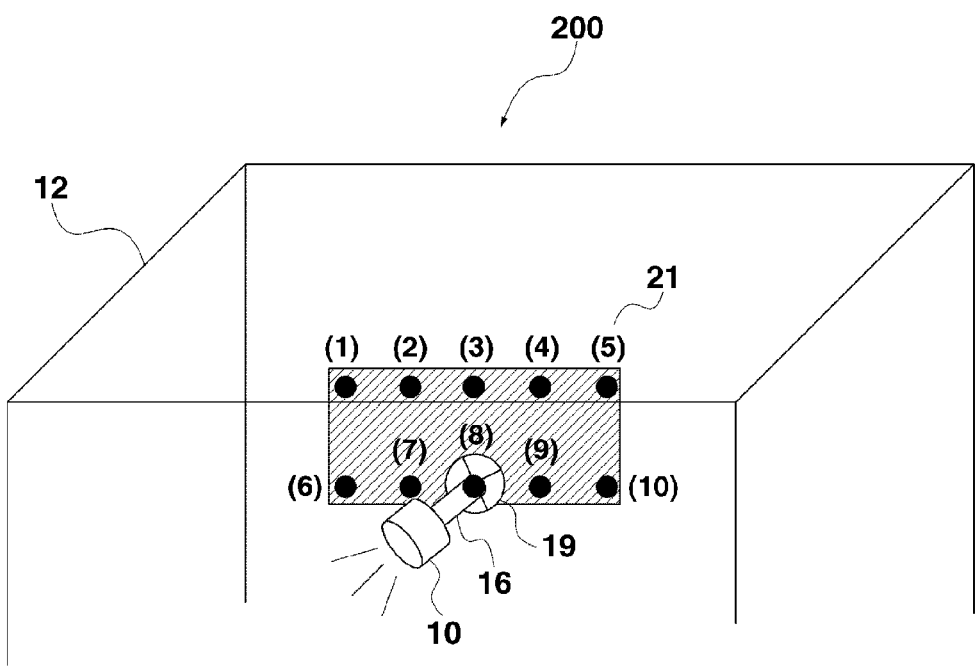
FIG. 5 illustrates positions where the lighting system according to the first exemplary embodiment can be arranged.
Figure 6:
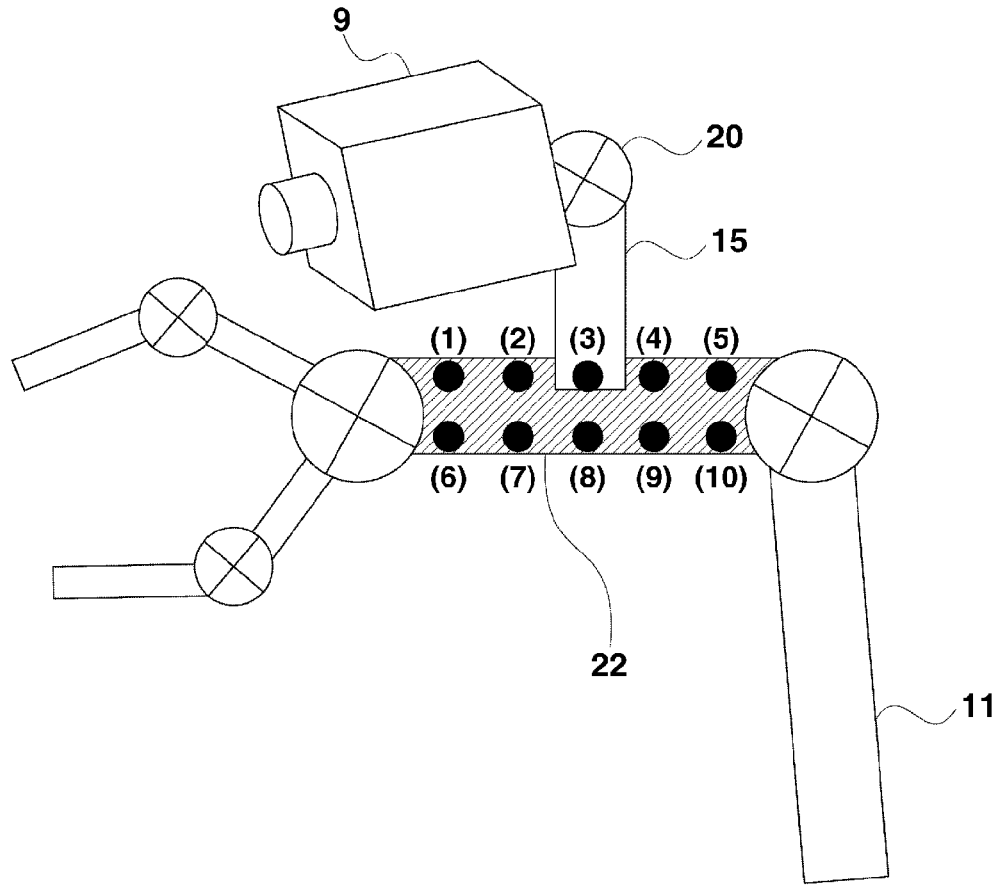
FIG. 6 illustrates positions where the imaging unit according to the first exemplary embodiment can be arranged.

As described above, according to the present exemplary embodiment, the directions of the lighting system 10 and the imaging unit 9 can be changed. In the present exemplary embodiment, as illustrated in FIG. 3, the lighting system 10 can select 20 different directions. As illustrated in FIG. 4, the imaging unit 9 can select 20 different directions. As illustrated in FIG. 5, the lighting system 10 can be arranged in 10 different positions. As illustrated in FIG. 6, the imaging unit 9 can be arranged in 10 different positions.

The following equation (1) gives 40000 combinations to allow generating 40000 different virtual space images.

$$20*20*10*10=40000 \text{ combinations} \quad (1)$$

In the present exemplary embodiment, however, the above equation does not consider the operation of the task process in the step 4. In the case where the operation of the task process is taken into consideration, if the robot arm 11 can be moved to 100 different positions, 100 different virtual space images are acquired for each of the 40000 different virtual space images. A method for generating the virtual space image is described in detail below.

Step 5: Setting Conditions for Evaluation Values

In the step 5 in which conditions for an evaluation value are set, a reference of an evaluation value by which the virtual space image generated in the step 4 is evaluated is set. The evaluation value according to the present exemplary embodiment is calculated for each virtual space image generated in the step 4. The evaluation value is calculated by a combination of a contrast value, an obstruction ratio, recognition reliability, and measurement reliability, and indicates the adaptability of arrangement of the virtual object to the work of the robot system. This means that the higher the evaluation value, the easier the robot system according to the present exemplary embodiment can work.

A method for calculating a contrast value, an obstruction ratio, recognition reliability, and measurement reliability is described below. In the step 5, determination whether to adopt each of the contrast value, the obstruction ratio, the recognition reliability, and the measurement reliability as the evaluation value or weighting to each evaluation value is set based on an instruction of a user.

A plurality of references indicating whether to adopt each of evaluation values can be previously set and the user may select a desired reference from among the plurality of references. In either case, the reference has only to enable determining whether each of the structural member 100 of the robot system is appropriately arranged.

In the present exemplary embodiment, the evaluation value indicates that the higher the evaluation value, the more suitable arrangement can be acquired in the case in which the robot arm 11 works on the object to be worked 17.

Step 6: Calculating Predetermined Evaluation Values

In the step 6 in which the evaluation value is calculated, the control unit 18 functions as a second acquisition unit configured to acquire the evaluation value indicating the adaptability of arrangement of the virtual space image and calculates the evaluation value of each of the virtual space images generated in the step 4. The evaluation value to be calculated is based on the reference set in the step 5. As described above, if the 40000 different virtual space images are generated, 40000 different evaluation values are calculated.

If the operation of the task process is taken into consideration, as described above, 100 different virtual space images are acquired for each of the 40000 different virtual space images. In this case, the above evaluation value is a mean value of evaluation values of 100 virtual space images, for example. The calculation of the mean value enables detecting arrangement suited for the work of the robot system throughout the entire task process.

Step 7: Setting Arrangement Parameters for Predetermined System Components

In the step 7, an appropriate arrangement parameter for the system component is set based on the calculation result in the step 6. The appropriate arrangement parameter is the one that indicates the arrangement of the system component in which the robot arm 11 can perform an appropriate work on the object to be worked 17, for example. As described above, the evaluation value highest in the evaluation values calculated in the step 6 is selected and the arrangement parameter corresponding to the virtual space image having the evaluation value is set. In addition to the highest evaluation value, a plurality of arrangement parameters may be set in descending order of the evaluation values.

In the case where the evaluation value has a positive value or a negative value, there is a method for comparing the evaluation value with a reference value as a method for detecting an optimum value. For example, the ratio of the evaluation value to the reference value is calculated and the mean value of the ratios being the closest to one is taken as an optimum value.

Step 8: Presenting Arrangement parameters

In the step 8 in which the arrangement parameter is presented to the user, the arrangement parameter of the system component set in the step 7 is presented to the user. Any method for informing the user using a display or a voice, for example, may be used as a method for presenting the parameter to the user.

The user can arrange the structural member 100 of the robot system in an appropriate position in a real space using the presented arrangement parameter.

As described above, the information processing of the control unit 18 according to the present exemplary embodiment is performed. According to the above information processing, the user can obtain the arrangement parameter capable of causing the robot arm 11 to perform a more appropriate work. Even in a robot system in which high degree of freedom of arrangement of the structural member makes it difficult to obtain appropriate arrangement of the structural member, it is possible to easily obtain the arrangement parameter of the structural member more suitable for the work of the robot system.

Method for Generating a Virtual Space Image

A method for generating a virtual space image in the step 4 is described below. A positional relationship between the imaging unit 9 and the object to be worked 17 in a three-dimensional model can be schematically illustrated in FIG. 7.

Figure 7:
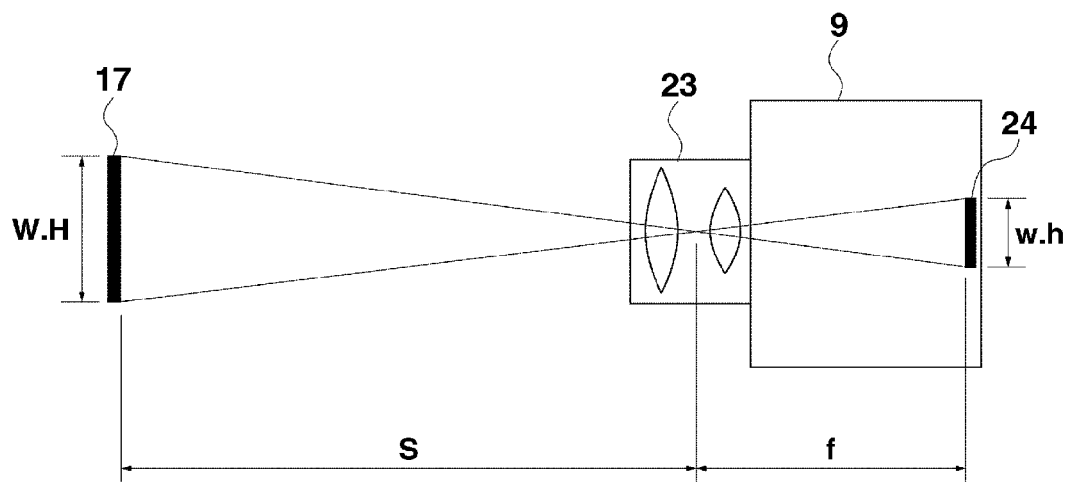
FIG. 7 is a schematic diagram illustrating a positional relationship between the imaging unit and an object to be worked.

FIG. 7 illustrates a positional relationship among a lens 23 of a camera 9 (the imaging unit 9), an image sensor 24 of the camera, and the object to be worked 17. In FIG. 7, there is a distance S between the object to be worked 17 and the lens 23 of the camera 9. A focal length f denotes a distance between the lens 23 and the image sensor 24 of the camera 9. A width W and a height H represent a horizontal width and a vertical height of an imaging region respectively. A width w and a height h represent a horizontal width and a vertical height the imaging sensor 24 respectively.

At this point, the parameters satisfy the following equation (2), so that the width W and the height H of the imaging region supposedly captured by the imaging unit 9 can be calculated.

$$w/W=h/H=f/S \qquad (2)$$

As described above, the lighting strength, the type of the illumination light, and an illuminating pattern have been determined as a lighting environment for the object to be worked 17. Further, BRDF, BTDF, and BSDF have been determined for the object to be worked 17. Thus, the virtual space image including an influence of lighting in the above imaging region can be generated using a general virtual model.

A background object and an obstacle except the object to be worked 17 included in the virtual space image can also be calculated as estimated images from a relationship among the focal length of the imaging unit 9, a distance between the lens 23 of the imaging unit 9 and an object, and the distance between the imaging sensor 24 and the lens 23.

Patterned light is illuminated by the lighting system 10 in an assembly position. The estimated image includes patterned light 25.

The above described method for generating a virtual image supposedly captured by the imaging unit 9 is presumed to use a conventional technique, so that a technique other than the above technique may be used. A large number of methods has also been discussed for generating an image captured at any view point from a three-dimensional model.

A Method for Calculating Contrast Value, Obstruction Ratio, Recognition Reliability and Measurement Reliability A method for calculating a contrast value, an obstruction ratio, recognition reliability, and measurement reliability in the step 6 is described below.

Recognition Reliability

A method for calculating the recognition reliability according to the present exemplary embodiment is described below. In the present exemplary embodiment, a correlation coefficient obtained by calculating a correlation between a two-dimensional model and the virtual space image generated from the three-dimensional CAD data of the object to be worked 17 is used as the recognition reliability. If the correlation coefficient exceeds a predetermined value, for example, it can be determined that an object on the image is an object to be recognized. A method using a correlation coefficient is generally referred to as a pattern matching method. The recognition reliability may be calculated using a method other than the pattern matching method.

For example, a method has been known in which a predetermined feature quantity (for example, histogram of oriented gradient (HOG) or scale invariant feature transform (SIFT)) is calculated from an image and a determination is executed for the feature quantity using a discriminator such as a support vector machine (SVM). In this case, the recognition reliability is represented by a discriminant function output value such as the support vector machine (SVM). Since the support vector machine (SVM) is a generally known method, the description thereof is omitted.

Measurement Reliability

The measurement reliability according to the present exemplary embodiment is represented by a correlation coefficient in the correlation calculation of a pattern matching process in performing a measurement process. The measurement process means the process for measuring the position and orientation of the object to be worked 17 from the image captured by the imaging unit 9 in the assembly position.

In the present exemplary embodiment, a three-dimensional measurement method using patterned light illumination is supposed as a measurement process method. In the three-dimensional measurement method using patterned light illumination, if a relative position among the object to be worked 17, the imaging unit 9, and the lighting system 10 is set, the virtual space image an be generated.

The virtual space image corresponding to the image captured by illuminating the patterned light is subjected to the pattern matching process using feature extraction and correlation calculation corresponding to an illuminated light pattern to calculate information about a two-dimensional position of a pattern on the image. Further, the information can be converted to spatial position information based on a relative position among the object to be worked 17, the imaging unit 9, and the patterned light illumination.

As illustrated in FIG. 6, a spot (each dot of illuminated light pattern) to be measured is positioned in an intersection of a projection straight line "$s_i$" extending from the lighting system 10 and a straight line "P" extending from the position of the camera 9.

Thus, if a geometric positional relationship between the straight lines is known, a spatial point $M_i = [x_w, y_w, z_w]_t$ can be acquired from an image point $m_i = [X_v, Y_v]_t$ on a surface of the image captured by the imaging unit 9. The subscript "i" denotes each projection spot number. The projection straight line from the lighting system 10 to an object to be measured is represented by the following equation (3).

[Math.1]

$$M_i = c + \delta s_i = co_i \quad (i=1, \ldots, N_p) \tag{3}$$

Where, "c" is the center coordinates of the lighting system 10, "$s_i$" is a gradient of each spot, and "$co_i$" is the offset coordinate of each spot. Further, "$N_p$" represents the total number of projection spots and delta indicates a parameter.

Geometric constraint related to an imaging system is expressed by the following equation (4).

$$PM'_i = wm'_i \tag{4}$$

The equation (4) shows that a spatial point $M'_i = [M_{ti}, 1]_t$ of a spot "i" is represented by the product of a perspective projection matrix "P" and an image point $m'_i = [m_{ti}, 1]_t$. Where, "w" is a constant which is not zero.

Where, c, si, and P are known parameters and $m_i$ is observation data, i.e., it corresponds to a spot position acquired as an image. The observation data mi can be calculated as two-dimensional position information on an image by executing the pattern matching process in which the image data on which patterned light is projected is subjected to the feature extraction and the correlation calculation corresponding to the projected spot pattern to calculate a correlation coefficient.

A method other than the feature extraction and the pattern matching process may be used as a method for calculating position information about the spot pattern from image data.

As a result of the above description, the three-dimensional position data including information about a depth distance in a patterned light illumination position can be calculated as the spatial point $M_i$ from the above equations (3) and (4). It is determined in advance that each of the observation data $m_i$ corresponds to which illumination spot.

Method for Calculating a Contrast Value

A method for calculating the contrast value according to the present exemplary embodiment is described below. The contrast value according to the present exemplary embodiment is defined by the following equation (5):

$$(Lmax - Lmin)/(Lmax + Lmin) \tag{5}$$

Where, Lmax and Lmin represent a maximum value and a minimum value of luminance values of an image respectively.

In general, if the contrast value of an image is excessively low or high, the reliability of the above recognition process and the measurement process tends to lower. In the present exemplary embodiment, the contrast calculated in the step 6 is expressed by the contrast value.

Method for Calculating an Obstruction Ratio

Figure 8:
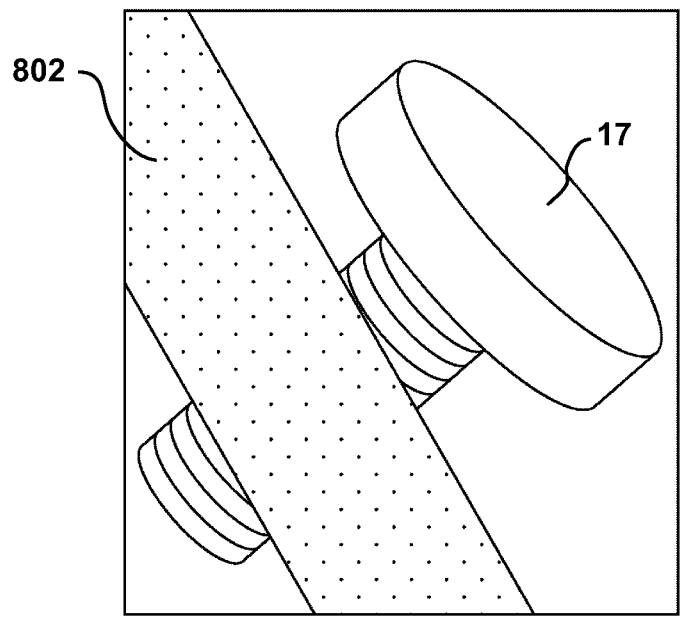
FIG. 8 illustrates an example of a virtual image according to the first exemplary embodiment.
Figure 9:
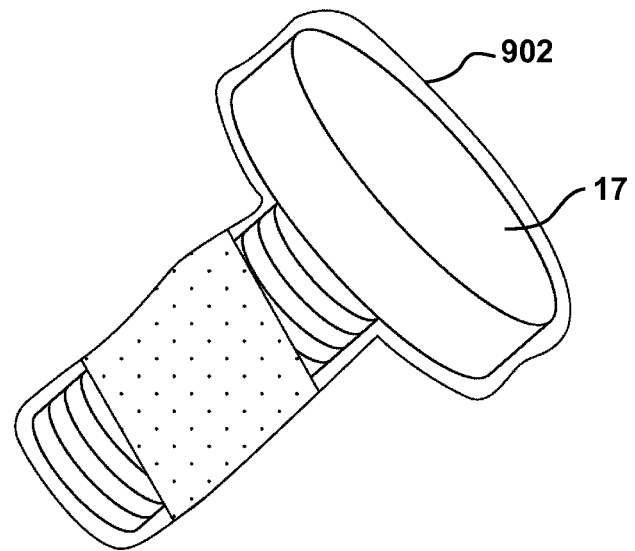
FIG. 9 illustrates an example of a region recognized as an object to be worked in a recognition process.

A method for calculating the obstruction ratio according to the present exemplary embodiment is described below. In the step 6, a ratio of an invisible region obstructed by another object 802 to a region of the object to be recognized and measured in the generated virtual image is calculated. In order to calculate the ratio of the invisible region due to obstruction, first, the region recognized as the object to be worked in the above recognition process is extracted from the virtual image illustrated in FIG. 8. FIG. 9 illustrates the extracted region 902.

Figure 10:
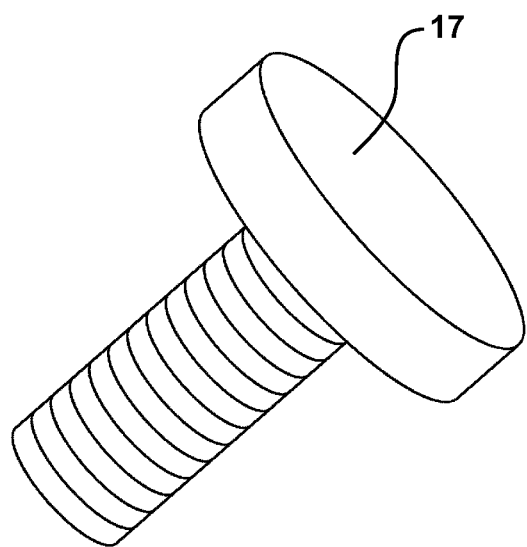
FIG. 10 illustrates an example of three-dimensional computer-aided design system (CAD) data of an object to be worked.

Then, a correlation coefficient is obtained by calculating again a correlation between a two-dimensional model generated from the three-dimensional CAD data of the corresponding object to be worked 17 illustrated in FIG. 10 and the virtual image in the extracted region in FIG. 9.

More specifically, the virtual image illustrated in FIG. 9 includes a part of the component which is partially obstructed by the robot arm 11, so that a correlation coefficient lowers than that in the case where obstruction is not caused. In the present exemplary embodiment, the obstruction ratio calculated in the step 6 is represented by the correlation coefficient. A method for calculating the ratio of the invisible region due to obstruction is not limited to the above.

A second exemplary embodiment is described below. The present exemplary embodiment is different from the first exemplary embodiment in that a range (a degree of freedom) within which a virtual object is arranged is limited. In the first exemplary embodiment, 40000 different virtual space images are generated for the arrangement of a virtual object. In the present exemplary embodiment, the control unit 18 functions as a limitation unit configured to limit a range within which the virtual object is arranged.

It may take much time for the control unit 18 to calculate an evaluation value for each virtual space image. For this reason, the present exemplary embodiment aims to reduce time consumed by the control unit 18 for calculation such that a range within which the virtual object is arranged is limited to reduce the number of the virtual space images to be generated. A method is described more specifically below.

Limitation according to a Shape of the Object to be Worked 17

Figure 11:
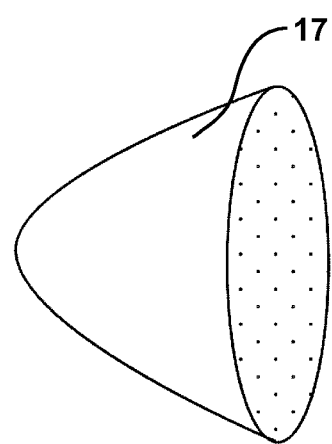
FIG. 11 illustrates an example of a shape of an object to be worked according to a second exemplary embodiment.

For example, if the object to be worked 17 has a concave shape and a region to be three-dimensionally measured is a concave (a tinted area) as illustrated in FIG. 11, a range within which the virtual object of the robot system is arranged can be limited.

The position and direction of the lighting system 10 for the three-dimensional measurement process by the patterned light illumination and the position and direction of the imaging unit 9 are limited to the position where the concave region can be illuminated and captured. It is assumed that the object to be worked 17 illustrated in FIG. 11 has a cone shape and an open bottom surface, and the inside of the conic surface (the tinted area) needs to be three-dimensionally measured.

Figure 12:
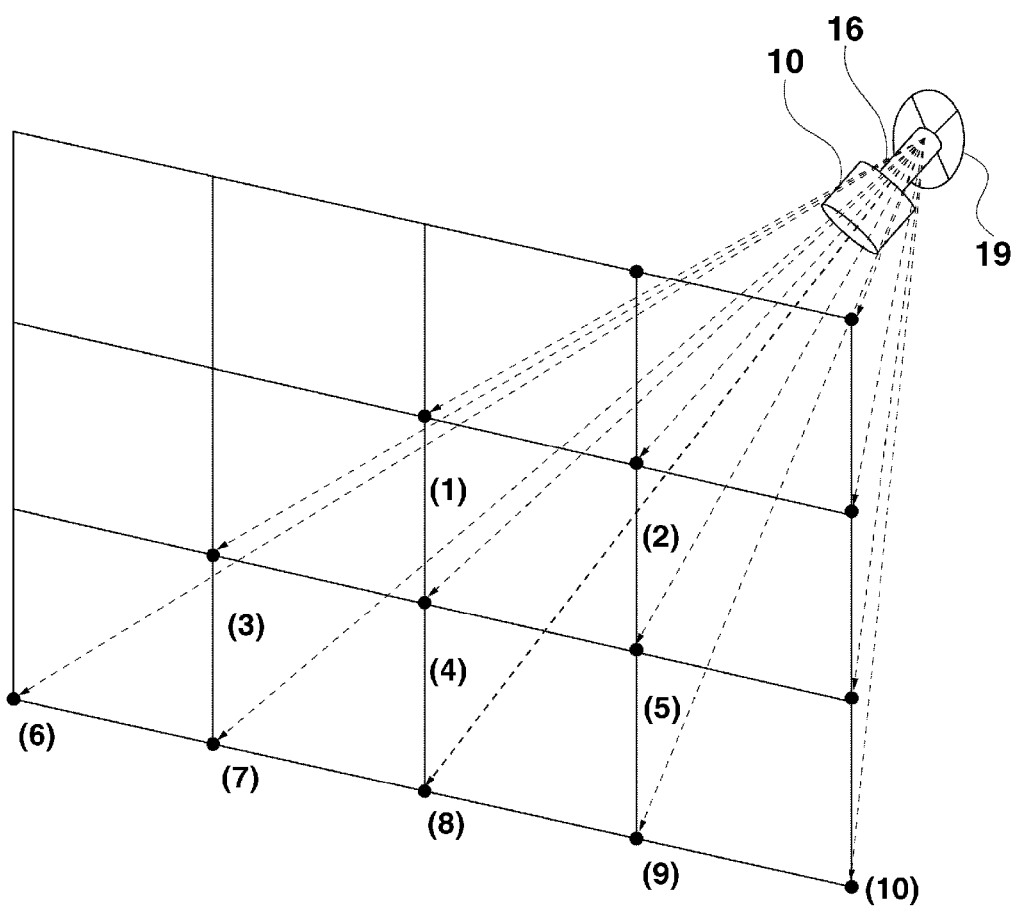
FIG. 12 illustrates a degree of freedom in directions of a lighting system according to the second exemplary embodiment.
Figure 13:
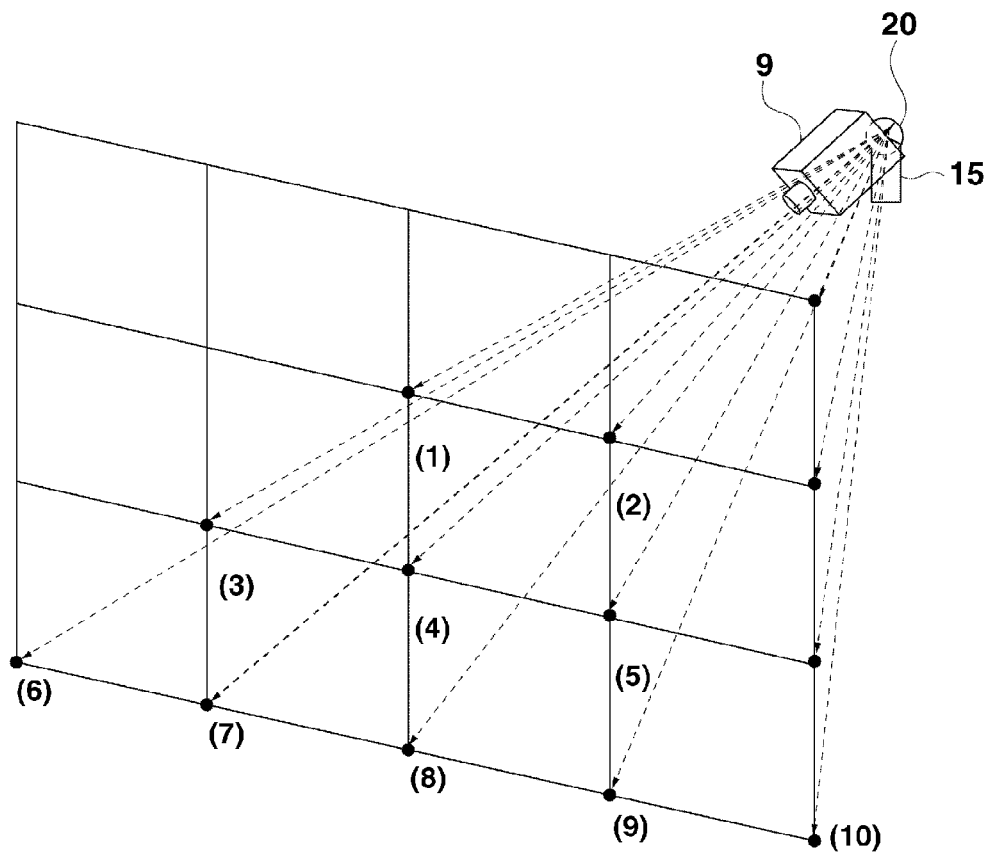
FIG. 13 illustrates a degree of freedom in direction of an imaging unit according to the second exemplary embodiment.
Figure 14:
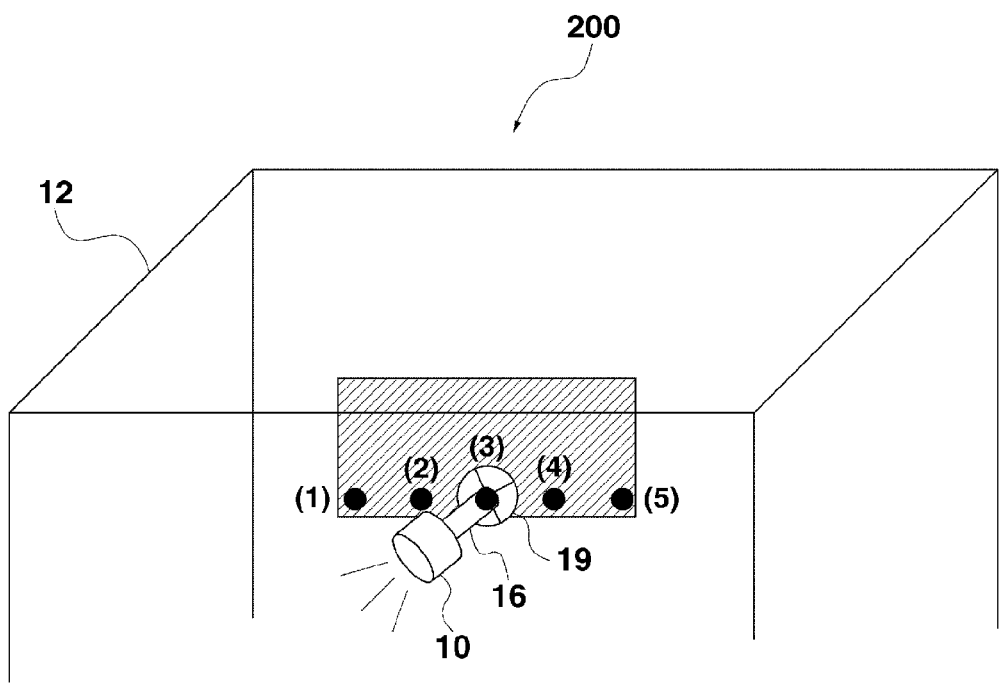
FIG. 14 illustrates a degree of freedom in positions of the lighting system according to the second exemplary embodiment.
Figure 15:
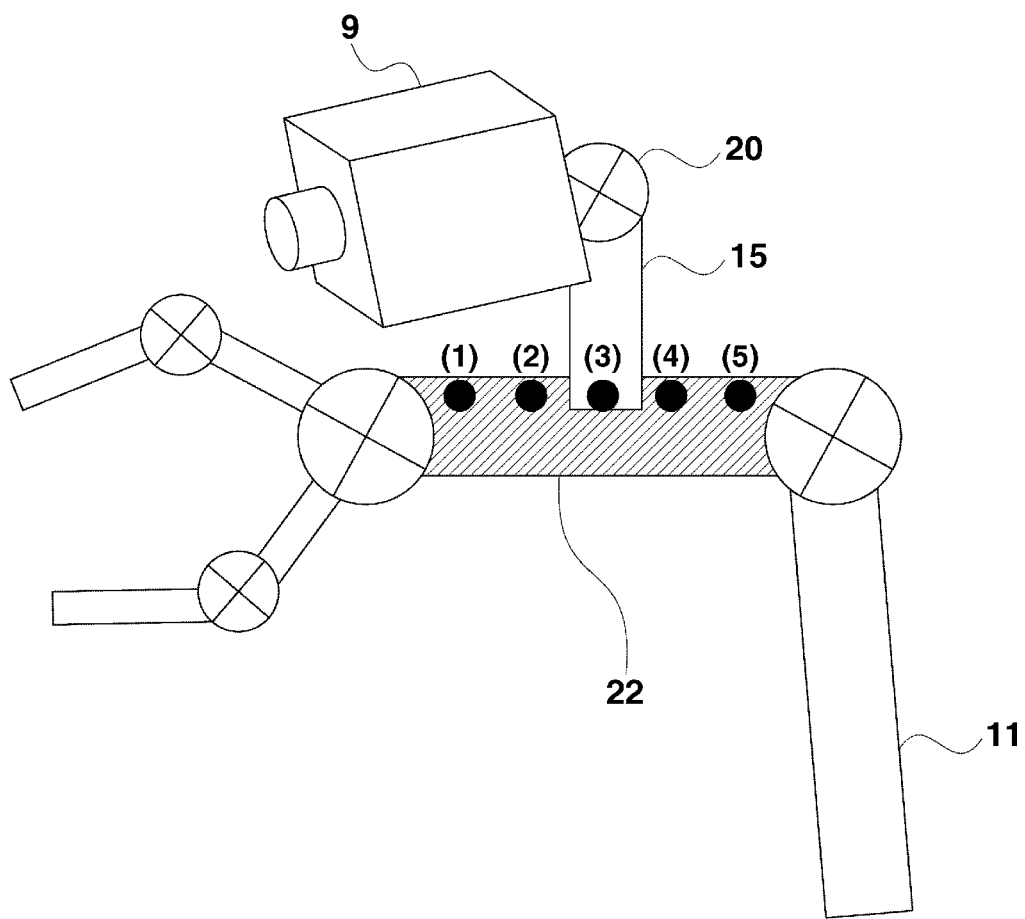
FIG. 15 illustrates a degree of freedom in positions of the imaging unit according to the second exemplary embodiment.

In this case, although 20 different parameters, for example, are set for the direction of each of the lighting system 10 and the imaging unit 9 in the first exemplary embodiment, the parameters in the present exemplary embodiment may be limited to 10 different degrees of freedom as illustrated in FIGS. 12 and 13. Although 10 different parameters are set for the direction of each of the lighting system 10 and the imaging unit 9 with respect to the robot arm 11 in a certain region in the first exemplary embodiment, the parameters in the present exemplary embodiment may be limited to 5 different degrees of freedom as illustrated in FIGS. 14 and 15. As a result, the degree of freedom of the evaluation value according to the present exemplary embodiment is limited to the degree of freedom represented by the following equation (6).

$$10*10*5*5=2500 \text{ combinations} \tag{6}$$

Accordingly, the time required for calculating the evaluation value can be reduced in the step 6. In the reduction of the above search degree of freedom, the number of patterns of the setting parameters related to the setting position and direction of the effective system components for an object in a concave shape may be previously created as a reference table. The search degree of freedom may be automatically reduced according to the input of the shape of the object in the step 1.

For example, a combination of the arrangement parameters of the lighting system and the imaging unit which can neither illuminate the concave shape nor capture an image of the concave shape is excluded from the reference table to allow the search degree of freedom to be automatically reduced.

Alternatively, the number of patterns of the arrangement parameters related to the arrangement position and direction of the system components may be limited based on the optical characteristics of the object to be worked 17 input in the step 1.

If the object to be worked 17 is a transparent body, the position and direction of the lighting system 10 for the three-dimensional measurement process by the patterned light illumination and the position and direction of the imaging unit 9 are limited according to the BTDF and the BSDF input in the step 1.

Although 20 different parameters are set for the direction of each of the lighting system 10 and the camera 9, for example, in the first exemplary embodiment, the parameters are limited to 5 different degrees of freedom in the present exemplary embodiment. Although 10 different parameters are set for the position of each of the lighting system 10 and the imaging unit 9 with respect to the robot arm 11 in the first exemplary embodiment, the parameters are limited to 3 different degrees of freedom in the present exemplary embodiment. As a result, the search degree of freedom of the evaluation value according to the present exemplary embodiment is limited to the degree of freedom represented by the following equation (7).

$$5*5*3*3=225 \text{ combinations} \tag{7}$$

Accordingly, the time required for calculating the evaluation value can be reduced in the step 6.

In the reduction of the above search degree of freedom, the number of patterns of the setting parameters related to the setting position and direction of the effective system components corresponding to the BTDF and the BSDF may be previously created as a reference table. The search degree of freedom may be automatically reduced according to the information about the optical characteristics of an object input in the step 1.

In the case of a transparent body such as a lens, for example, a combination of the setting parameters of the lighting system and the imaging unit in the case where the BTDF is equal to or less than a predetermined value is excluded from the reference table to allow the search degree of freedom to be automatically reduced.

As described above, the evaluation method in the recognition and measurement control system according to the present exemplary embodiment enables reduction of the time required for calculating the evaluation value by limiting the search degree of freedom corresponding to the combination of the setting parameters in calculating the evaluation value.

Limitation of a Range within which Other Virtual Objects are Arranged

Figure 16:
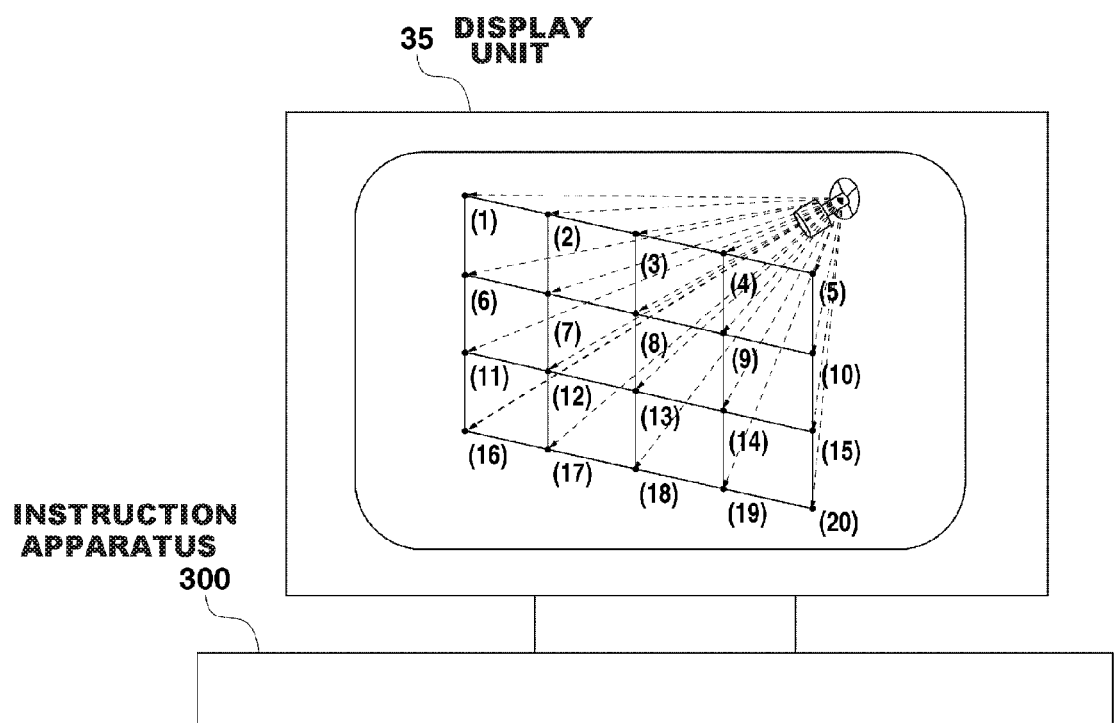
FIG. 16 illustrates an example of limitations on an arrangement of a virtual object according to a user's instruction.

As a method for limiting a range within which a virtual object is arranged, the following method may be used. For example, the arrangement of a virtual object obviously unsuitable for the work of the robot system is eliminated based on an instruction input by a user who operates the robot system. FIG. 16 illustrates limitations on the arrangement of a virtual object according to the user's instruction.

In FIG. 16, a display unit 35 displays the position or the arrangement of the virtual object to the user with using an image. The display unit 35 may be a general monitor. An instruction apparatus 300 transmits the user's instruction for the arrangement of the virtual object to the control unit 18. The instruction apparatus 300 may include a unit similar to a general personal computer. If the user issues an instruction to delete the arrangement and the direction of an unnecessary virtual object via an input unit such as a mouse, the instruction apparatus 300 transmits the deletion instruction to the control unit 18. The instruction apparatus 300 may cause the monitor 35 to display information about arrangement and direction of the instruction apparatus 300 after the deletion processing.

As another method for limiting a range within which a virtual object is arranged, there exists a method for detecting that the structural member of the robot system is updated. In this case, the control unit 18 functions as a detection unit configured to detect that the structural member of the robot system is deleted or added, generates a virtual space image only in the changed range, and calculates an evaluation value. The range within which the virtual object is arranged is limited based on the update of the structural member of the robot system, thus a more effective robot system can be constructed.

Addition of a Screen Device

A third exemplary embodiment is different from the first and second exemplary embodiments in that a screen device is added as a system configuration to be input in the step 2. Further, a designation of where the screen device is set in the work area of a robot cell is added to the conditions for arranging the system components to be input in the step 3.

Figure 17:
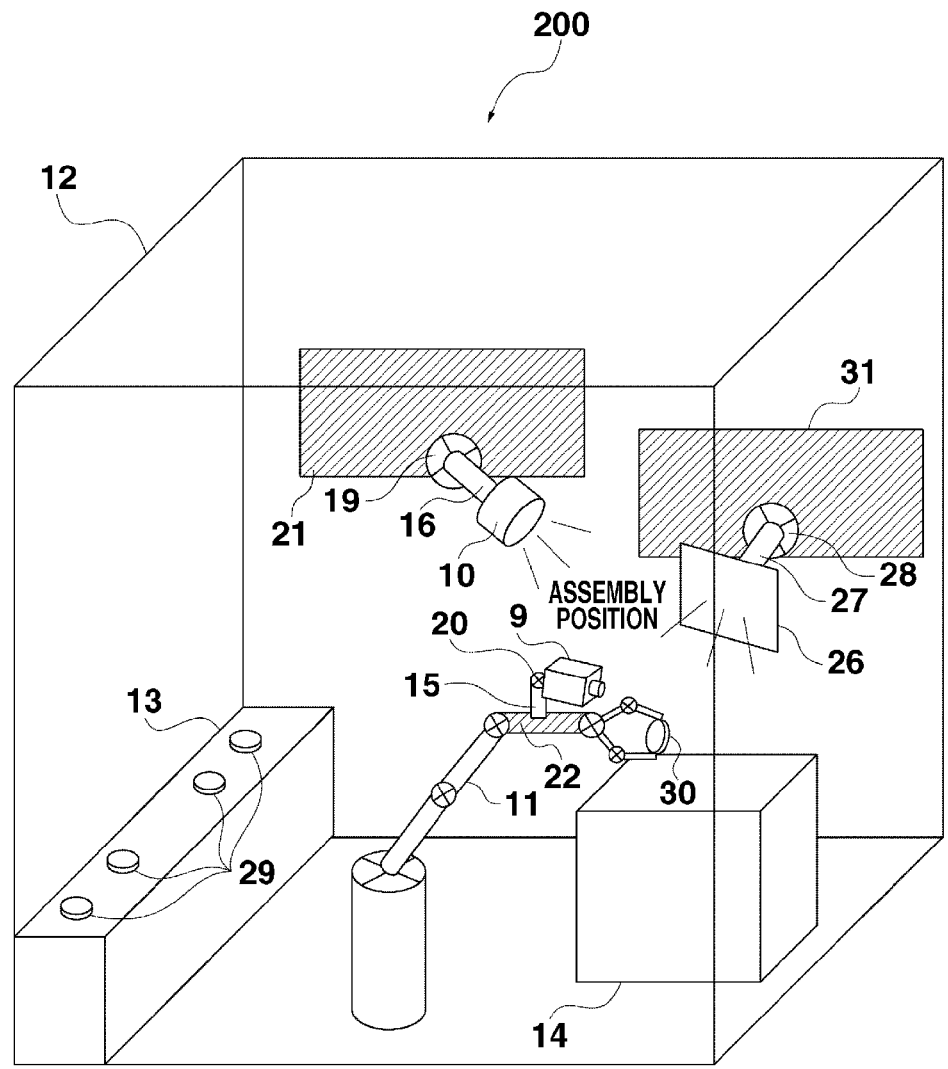
FIG. 17 illustrates an example of a configuration of a robot system according to a third exemplary embodiment.

As illustrated in FIG. 17, a setting position of a screen device 26 in the area frame 12 in the work area 200 is specified by a certain range.

In the present exemplary embodiment, the setting position is specified by a certain range 31 indicated by a shaded area illustrated in FIG. 17. At this point, the screen device 26 is held with a holding apparatus 27 having a predetermined movable range in the work area 200. The holding apparatus 27 includes an actuator 28, and the direction of the screen device 26 is controlled by the robot system.

Setting positions and directions of the screen device 26 to be set in the work area 200 via the holding apparatus 27 are added as setting parameters of the system component with a plurality of patterns in calculating an evaluation value in the step 6.

Accordingly, in the present exemplary embodiment, only the point that is different in the evaluation method of the robot system from the first exemplary embodiment is described below. The description of other points similar to the first exemplary embodiment is omitted herein.

In the present exemplary embodiment, it is supposed that a component with a mirror surface 29 and a component composed of a transparent body 30 are taken as the object to be worked 17. For example, in the case where the three-dimensional measurement method using patterned light illumination described in the first exemplary embodiment is applied to the component with a mirror surface, generally, the patterned light illuminated from the lighting system is once displayed on the screen device and an image in which the patterned light displayed on the screen device is reflected by the mirror surface is captured by the camera and subjected to a calculation process. This process is repeated a plurality of times while a relative arrangement among the patterned light, the component, the camera, and the screen device is changed.

In the case where the three-dimensional measurement method using patterned light illumination described in the first exemplary embodiment is applied to the component composed of a transparent body, generally, the patterned light illuminated from the lighting system is once displayed on the screen device. Then an image in which the patterned light displayed on the screen device is transmitted through the transparent body is captured by the camera and subjected to a calculation process. This process is repeated a plurality of times while a relative arrangement among the patterned light, the component, the camera, and the screen device is changed.

The evaluation method according to the present exemplary embodiment is such that the screen device is added to the first and second exemplary embodiments to apply the three-dimensional measurement method using the patterned light illumination with respect to the mirror surface or the transparent body.

The third exemplary embodiment is different from the first and second exemplary embodiments in that a type and the number of the screen devices 26 are input as the system component in the step 2. More specifically, information about the manufacturer and the model of the screen device 26 is input.

In the present exemplary embodiment, as is the case with the imaging unit 9, the lighting system 10, and the robot arm 11 according to the first and second exemplary embodiments, characteristics data for each manufacturer and model are prepared as a database. By specifying the manufacturer and model, characteristics information about the screen device 26 can be input. The characteristics information about the screen device 26 includes a shape, a size, and optical characteristics of the screen device 26.

In the step 3, as is the case with the lighting system 10 according to the first and second exemplary embodiments, it is specified where the screen device 26 is set in the work area of the robot cell. More specifically, as illustrated in FIG. 17, the position where the screen device 26 is set in the work area is specified in a certain range.

In the present exemplary embodiment, the setting position is specified by the certain range 31 indicated by a shaded area illustrated in FIG. 17. At this point, the screen device 26 is held with the holding apparatus 27 having the predetermined movable range in the work area 200. The holding apparatus 27 includes an actuator 28, and the setting direction of the screen device 26 is controlled by the robot system.

In the step 6, the setting parameter of the setting direction of the screen device 26 and the setting parameter related to the position of the screen device 26 in the certain region are added as the setting parameters of the system components in the first and second exemplary embodiments.

For example, according to the present exemplary embodiment, the setting parameter of the arrangement direction of the screen device 26 has 20 different degrees of freedom and the setting parameter related to the position of the screen device 26 has 10 different degrees of freedom. Therefore, the search degree of freedom of the evaluation value is represented by the following equation (8) based on the search degree of freedom (40000 combinations) set in the first exemplary embodiment.

$$40000*20*10=8000000 \text{ combinations} \qquad (8)$$

In the above search degree of freedom, the calculation of the evaluation value in step the 6 is similarly performed to that in the first and second exemplary embodiments. For the processes in the step 7 and the subsequent steps, there are selected the setting parameter of the arrangement direction of the screen device 26 and the arrangement parameter related to the position of the screen device 26 in the certain region which satisfy the reference value. Excepting that the presentation of those parameters to the user is added, the present exemplary embodiment is similar to the first and second exemplary embodiments.

In the above, the method is described in which the patterned light illuminated from the lighting system 10 is displayed on the screen device 26 and captured as an image. However, in addition to the above described method, another method may be used in which the patterned light is displayed on a display device such as a liquid crystal display (LCD) instead of the lighting system 10 and an image in which the patterned light is reflected by the mirror surface or an image in which the patterned light is transmitted through the transparent body is captured. In this case, there is no need for providing the screen device and the patterned light illumination function of the lighting system, and the display device can be handled similarly to the lighting system in the case where the patterned light is illuminated in the first and second exemplary embodiments.

A large number of known methods has been discussed about the three-dimensional measurement in the mirror surface and the transparent body described above, so that the description thereof is omitted. As described above, in the recognition and measurement control system according to the present exemplary embodiment, the arrangement parameter can be determined in consideration of the arrangement and the orientation of the screen device.

In the evaluation method in the robot system according to a fourth exemplary embodiment, an operation pattern including an operation speed of the robot arm is added as the arrangement condition for the system component input in the step 3 described in the first exemplary embodiment. Further, tact time of a task process is added as the evaluation value calculated in the step 6, and tact time of the task process is added as the reference value that the evaluation value to be input needs to satisfy in the step 5.

Furthermore, the use of an image in consideration of dynamic characteristics of the robot arm and the object to be worked as the virtual image acquired by the imaging unit 9 described in the first exemplary embodiment is added. Accordingly, in the present exemplary embodiment, only the point that is different in the evaluation method of the robot system from the first exemplary embodiment is described below. The description of other points similar to the first exemplary embodiment is omitted herein.

In the present exemplary embodiment, it is assumed that an object to be recognized and measured as the object to be worked is the one that can cause vibration when the object to be worked is moved and stopped while being gripped by the robot arm and has a relatively small Young's modulus.

For example, if a flexible print circuit board is moved and stopped while being gripped by the robot arm, the circuit board may cause vibration for a certain time period according to its Young's modulus and vibration damping characteristics. At this point, if the component is subjected to the recognition and the measurement process with the vibration left, the accuracy of the recognition and the measurement process is degraded because the shape of the component on the image is deformed.

In a component which cannot neglect such vibration, the operation pattern including the operation speed of the robot arm in acquiring an image needs to be appropriately determined. Therefore, according to the present exemplary embodiment, previously set 10 operation patterns including the operation speed of the robot arm 11 are added to the search degree of freedom (40000 combinations) set in the first exemplary embodiment. Therefore, the search degree of freedom of the evaluation value according to the present exemplary embodiment is represented by the following equation (9).

$$40000*10=400000 \text{ combinations} \quad (9)$$

In the step 5, the reference value of the tact time in the task process is input as well as the reference value that other evaluation values need to satisfy. In the step 6, each evaluation value including the tact time is calculated with respect to the search degree of freedom of 400000 combinations.

When the recognition reliability and the measurement reliability are calculated as the evaluation value, the image with the object to be worked being deformed is virtually generated to execute the recognition process and the measurement process. When the image is generated, the dynamic characteristics of the object to be worked are considered in the 10 operation patterns corresponding to the operation speed of the robot arm 11.

In the step 7, each evaluation value including the tact time of the task process is compared with the reference value to be satisfied by each evaluation value input in the step 5, similar to the case of other evaluation values in the first exemplary embodiment. Then, a combination of the setting parameters indicating values closest to the reference value is selected.

More specifically, the object to be worked is deformed according to its Young's modulus and vibration damping characteristics and the operation speed of the robot arm. The evaluation value is calculated using the image deformed by an influence of the above factors. Accordingly, the setting parameters of the system components can be determined in consideration of both the deformation of the component caused by the operation of the robot arm and the tact time depending on the operation speed of the robot arm.

The method for selecting an optimal combination of the setting parameters is similar to that of the first exemplary embodiment. The method for presenting the arrangement parameters of the system component determined in step the 7 to the user in the final step 8 is also similar to that of the first exemplary embodiment.

In the present exemplary embodiment, although the operation pattern including the operation speed of the robot arm 11 is set in advance, the user may directly input a plurality of the operation patterns in the step 4. Alternatively, the user may select an appropriate operation pattern from among a plurality of the operation patterns previously set and presented in the step 4.

As described above, the user can easily set the camera and the lighting system of the actual robot system based on the presented arrangement parameters with including the tact time in the evaluation value in the robot system according to the present exemplary embodiment.

In a fifth exemplary embodiment, a graphical user interface with a user is described below.

Figure 18:
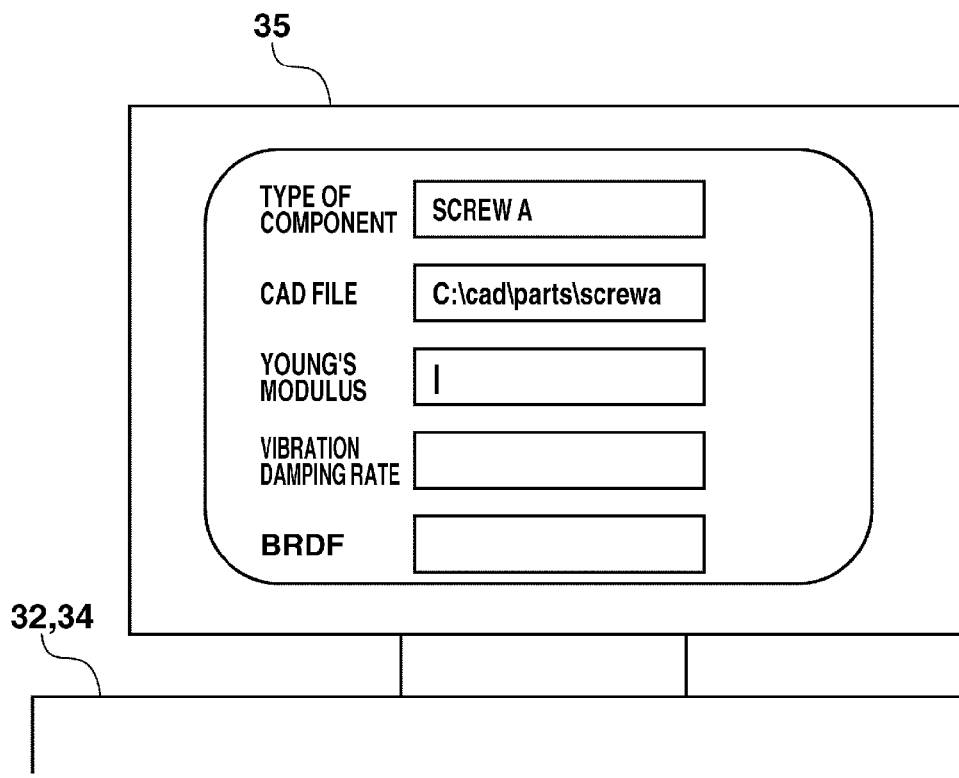
FIG. 18 illustrates an example of a graphical user interface in a step 1.

FIG. 18 illustrates an example of a graphical user interface according to the present exemplary embodiment. FIG. 18 illustrates the graphical user interface in the step 1 described above. The user inputs information about the type and the physical characteristic of an object to be recognized and measured according to guidance displayed on the display unit.

Figure 19:
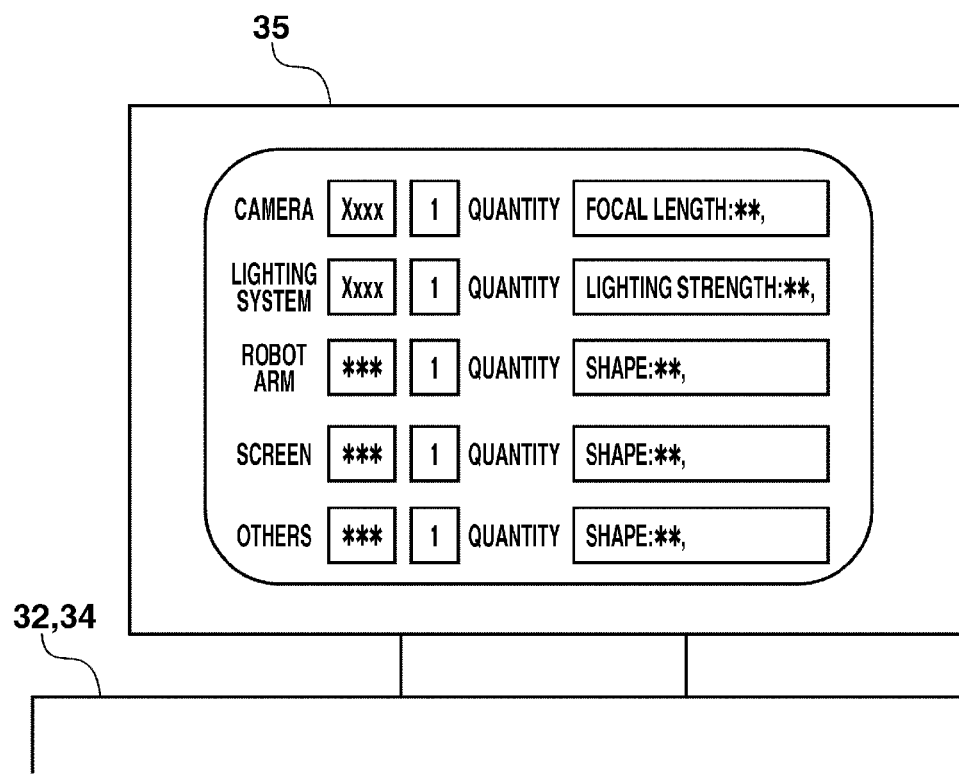
FIG. 19 illustrates an example of a graphical user interface in a step 2.

FIG. 19 illustrates the graphical user interface in the step 2 described above. The user inputs the type and the number of the system components included in the recognition and measurement control system according to the displayed guidance.

Figure 20:
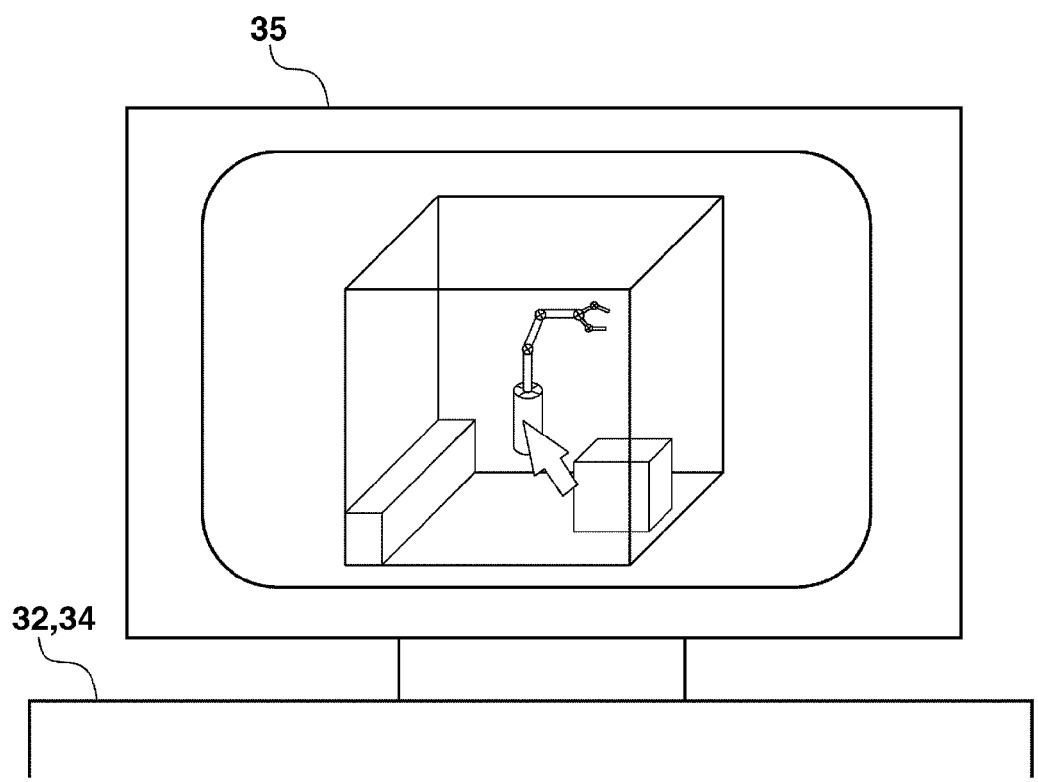
FIG. 20 illustrates an example of a graphical user interface in a step 3.

FIG. 20 illustrates the graphical user interface in the step 3 described above. The user inputs conditions for arranging the system components according to the guidance displayed on the display unit.

As illustrated in FIG. 20, when the conditions for arranging the system components are input, the three-dimensional model in the work area displayed on the screen of the display unit can be used for the process. The user can specify the region where the system component is arranged by dragging the targeted system component by a cursor. The user may directly input the region where the system component is arranged using coordinate values. The specified region where the system component is arranged is calculated by the program and stored as a coordinate value in the work area.

Figure 21:
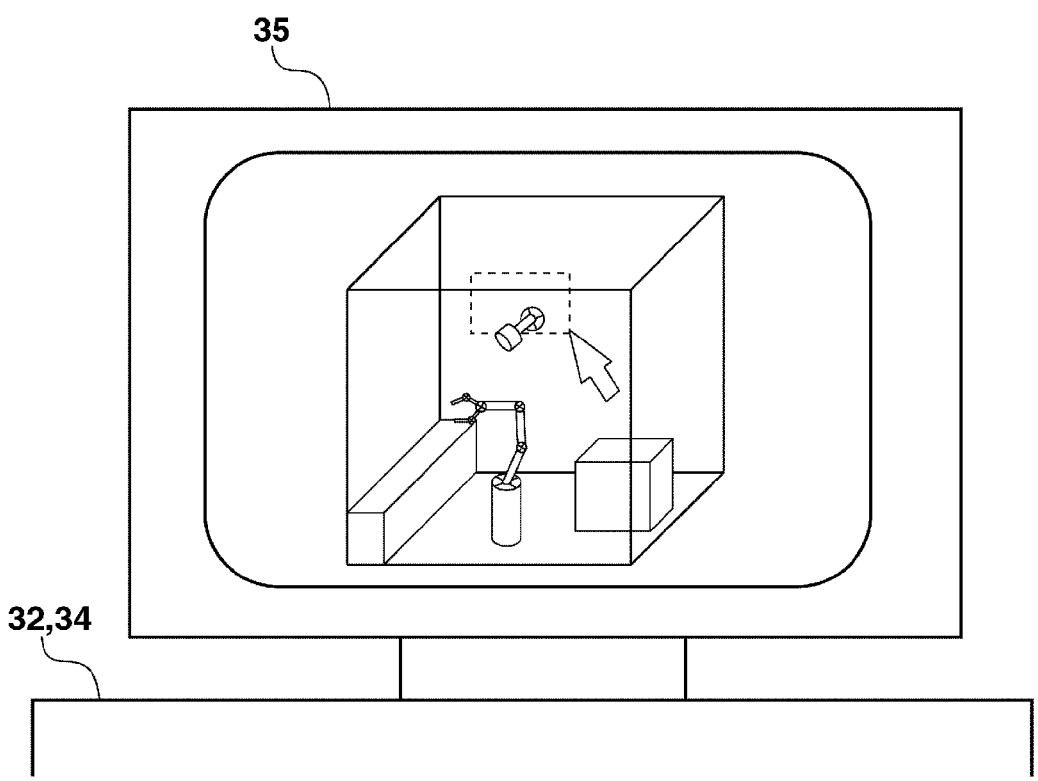
FIG. 21 illustrates an example of a graphical user interface according to a fifth exemplary embodiment.

As illustrated in FIG. 21, the control unit 18 functions as a display unit configured to display a virtual object and a virtual space. When the region where the lighting system and the camera are arranged is specified, the user can specify a rectangular region by dragging a cursor in the display device to set a desired region. The user may directly input the arrangement region using coordinate values.

Figure 22:
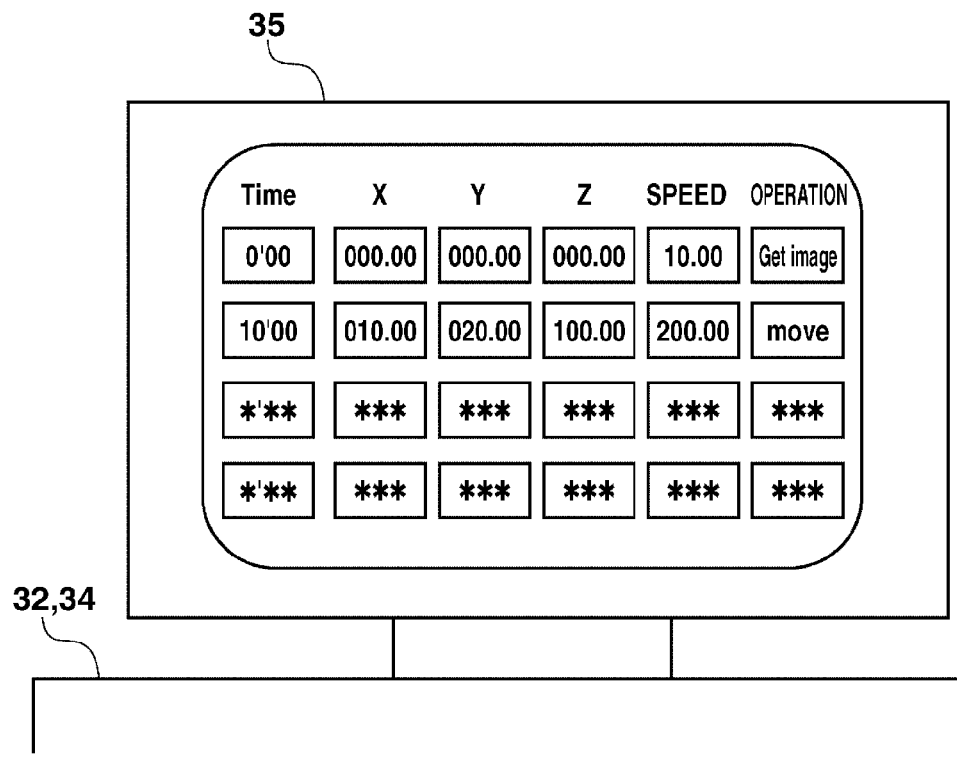
FIG. 22 illustrates an example of a graphical user interface in a step 4.

FIG. 22 illustrates the graphical user interface in the step 4 described above. The user inputs the contents of the task process according to the guidance displayed on the display unit. As illustrated in FIG. 22, an operation flow at the time of processing the task of the robot arm may be input by a coordinate value or selected from a previously set typical task process model.

The graphical user interface similar to those in FIGS. 18 to 22 described above may be used for the processes in the steps 5 to 8.

Figure 23:
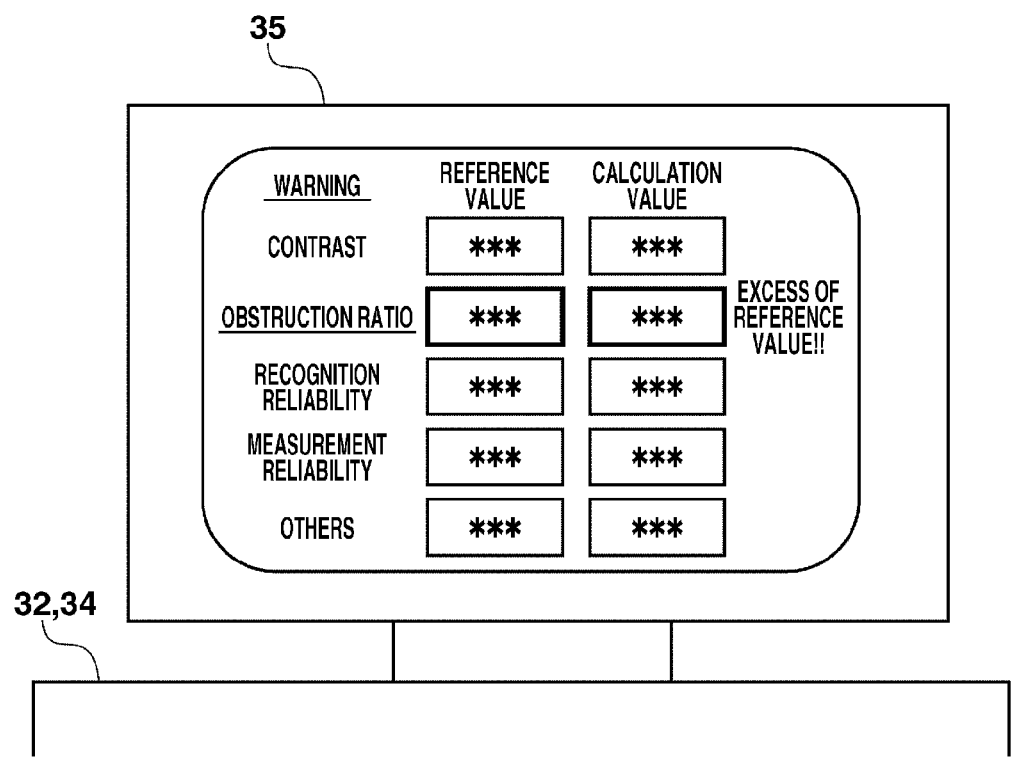
FIG. 23 illustrates an example of a graphical user interface of warnings according to the fifth exemplary embodiment.

The above described predetermined evaluation value may be calculated as required in a production line already being in operation and if the evaluation value does not satisfy the previously set reference value, notification may be performed as an additional function. For example, warnings may be given to the user by display on the screen illustrated in FIG. 23 or a voice.

If the user receives the warnings, the user can modify the settings so that the setting parameters of the system components satisfy the reference value using again the evaluation method, a simulation apparatus, and an evaluation apparatus in the recognition and measurement system.

As described above, the evaluation method and the evaluation apparatus in the recognition and measurement system according to the present exemplary embodiment give warnings to the user if the arrangement parameters do not satisfy the reference value while the production line is being in operation. Accordingly, the user can easily determine the arrangement parameters capable of executing the high-reliability recognition and measurement process without the degradation of the quality of an image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-053409 filed Mar. 10, 2010, which is hereby incorporated by reference herein in its entirety.

The invention claimed is:

1. An information processing apparatus comprising:
a memory configured to store a program; and
a processor that executes the program to implement:
an arrangement unit configured to arrange a virtual object corresponding to a structural member in a virtual space corresponding to a working space of a robot system;
a first acquisition unit configured to acquire a plurality of the virtual space images, different in arrangement of the virtual object from one another, in the virtual space which corresponds to a captured image and in which the virtual object is arranged;
a second acquisition unit configured to acquire, without an instruction of an operator of the information processing apparatus, a plurality of evaluation values each corresponding a respective one of the plurality of the virtual space images, each evaluation value indicating an amount of adaptability of arrangement of the virtual object to the work of the robot system based on the virtual space image; and
a selection unit configured to select an optimum evaluation value optimally suitable for the work of the robot system, from among the plurality of the evaluation values, by determining a respective difference value between a reference value and each of the plurality of evaluation values, and selecting as the optimum evaluation value an evaluation value having a smallest difference value.

2. The information processing apparatus according to claim 1, further comprising a notification unit configured to notify a user of an arrangement parameter of the structural member of the robot system corresponding to the selected optimum evaluation value.

3. The information processing apparatus according to claim 1, wherein the second acquisition unit acquires at least one evaluation value using at least one of a contrast value of the virtual space image, recognition reliability of the virtual object in the virtual space image, an obstruction ratio of the virtual object in the virtual space image, and measurement reliability of the virtual object in the virtual space image.

4. The information processing apparatus according to claim 1, wherein arrangement of the structural member of the robot system includes at least one of arrangement of an imaging unit, arrangement of a lighting system for illuminating an object to be worked in the robot system, arrangement of a robot arm for working the object to be worked, and arrangement of a screen device.

5. The information processing apparatus according to claim 1, wherein the second acquisition unit acquires at least one evaluation value using at least one of tack time of work of the robot system, information about the illumination of the lighting system, and information about a shape model of the structural member.

6. The information processing apparatus according to claim 1, further comprising a display control unit configured to cause a display unit to display the virtual space and the virtual object as a computer graphics image.

7. The information processing apparatus according to claim 1, further comprising a limitation unit configured to limit an arrangement range within which the virtual object is arranged by the arrangement unit.

8. The information processing apparatus according to claim 7, wherein the limitation unit limits the arrangement range within which the virtual object is arranged by the arrangement unit based on a user's instruction.

9. The information processing apparatus according to claim 7, wherein the limitation unit limits the arrangement range within which the virtual object is arranged by the arrangement unit according to a shape of the object to be worked in the robot system.

10. The information processing apparatus according to claim 7, further comprising a detection unit configured to detect a change in the structural member of the robot system, wherein the limitation unit limits the arrangement range within which the virtual object is arranged by the arrangement unit based on the detected change.

11. A robot system comprising:
a memory configured to store a program; and
a processor that executes the program to implement:
an arrangement unit configured to arrange a virtual object corresponding to a structural member of the robot system in a virtual space corresponding to a working space of the robot system;
a first acquisition unit configured to acquire a plurality of the virtual space images, different in arrangement of the virtual object from one another, in the virtual space which corresponds to the captured image and in which the virtual object is arranged;
a second acquisition unit configured to acquire, without an instruction of an operator of the robot system, a plurality of evaluation values each corresponding a respective one of the plurality of the virtual space images, each evaluation value indicating an amount of adaptability of arrangement of the virtual object to the work of the robot system based on the virtual space image;

a selection unit configured to select an optimum evaluation value optimally suitable for the work of the robot system, from among the plurality of the evaluation values, by determining a respective difference value between a reference value and each of the plurality of evaluation values, and selecting as the optimum evaluation value an evaluation value having a smallest difference value; and an output unit configured to output an arrangement parameter of the structural member based on the selected optimum evaluation value.

12. A method comprising:

arranging a virtual object corresponding to a structural member in a virtual space corresponding to a working space of a robot system;

acquiring a plurality of the virtual space images, different in arrangement of the virtual object from one another, in the virtual space which corresponds to a captured image and in which the virtual object is arranged;

acquiring, without an instruction of an operator of the method, a plurality of evaluation values each corresponding a respective one of the plurality of the virtual space images, each evaluation value indicating an amount of adaptability of arrangement of the virtual object to the work of the robot system based on the virtual space image; and selecting an optimum evaluation value optimally suitable for the work of the robot system, from among the plurality of the evaluation values, by determining a respective difference value between a reference value and each of the plurality of evaluation values, and selecting as the optimum evaluation value an evaluation value having a smallest difference value.

13. A non-transitory computer-readable storage medium storing a computer program that when executed by a computer causes the computer to function as an information processing apparatus comprising:

an arrangement unit configured to arrange a virtual object corresponding to a structural member in a virtual space corresponding to a working space of a robot system;

a first acquisition unit configured to acquire a plurality of the virtual space images, different in arrangement of the virtual object from one another, in the virtual space which corresponds to a captured image and in which the virtual object is arranged;

a second acquisition unit configured to acquire, without an instruction of an operator of the information processing apparatus, a plurality of evaluation values each corresponding a respective one of the plurality of the virtual space images, each evaluation value indicating an amount of adaptability of arrangement of the virtual object to the work of the robot system based on the virtual space image; and a selection unit configured to select an optimum evaluation value optimally suitable for the work of the robot system, from among the plurality of the evaluation values, by determining a respective difference value between a reference value and each of the plurality of evaluation values, and selecting as the optimum evaluation value an evaluation value having a smallest difference value.

* * * * *